Patented Nov. 9, 1943

2,333,752

UNITED STATES PATENT OFFICE 2,333,752

HIGH-MOLECULAR COMPOUNDS OF THE POLYAMIDE TYPE AND PROCESS OF PRODUCING SAME

Hanns Ufer, Ludwigshafen-on-the-Rhine, Germany; vested in the Alien Property Custodian No Drawing. Application August 25, 1939, Serial No. 291,931. In Germany September 7, 1938

2 Claims. (Cl. 260—78)

The present invention relates to high molecular compounds of the type of polyamides and a process of producing same.

In U. S. application Ser. No. 252,630, filed on January 24, 1939, in the names of Hanns Ufer, Willi Schmidt and Max Mattauch there has been described a process for the production of high molecular compounds similar to polyamides by reacting amines having at least two reactive amino groups separated from each other by at least two carbon atoms with unsaturated, in particular alpha-beta-unsaturated, monocarboxylic acid substances (i. e. the said acids themselves or their derivatives) at temperatures at which amide formation between at least two molecules of the amino acids formed from the reaction components takes place.

I have now found that high molecular compounds similar to polyamides can be obtained by heating monoarylamino carboxylic acid substances (i. e. the said acids themselves or their derivatives) obtainable by adding primary monoarylamines on unsaturated monocarboxylic acids, preferably $\alpha$-$\beta$-unsaturated monocarboxylic acids, or their derivatives, at temperatures at which amide formation between at least two molecules of the said amino carboxylic acid substances takes place. Monoarylamino carboxylic acid substances of the said kind produced in any desired manner may be started with.

As suitable starting materials there may be mentioned for example phenyl-, tolyl-, xylyl-, ethylphenyl-, butylphenyl-, dodecylphenyl-, chlorphenyl-, alkoxyphenyl, hydroxyalkyphenyl-$\beta$-amino carboxylic acids, for example the $\beta$-amino propionic or butyric acids etc. substituted by the said substituents and also the corresponding compounds containing naphthyl instead of phenyl radicals. When the free acids are employed water is split off in the reaction; if, however, esters of the said acids, for example methyl-, ethyl- or butylesters are employed the corresponding alcohols are split off. In the case of amides ammonia is split off.

The reaction consists probably in a formation of long chain polyamides according to the following scheme:

From these components the monoarylamino carboxylic substances are first formed and these undergo the conversion according to the above scheme.

The conditions under which the conversion takes place are usually the same as described in the said application Ser. No. 252,630. By suitable selection of the initial materials and the mode and duration of heating polyamide-like compounds may be obtained which are adapted to the purposes intended. The products can be employed for example in the textile assistant field and in the lacquer and varnish industry. Many of the products are compatible with acetyl cellulose and improve the adhesion of acetyl cellulose films.

The following examples will further illustrate how the present invention may be carried out in practice but the invention is not restricted to these examples. The parts are by weight.

*Example 1*

500 parts of phenyl-$\beta$-aminopropionic acid are heated under ordinary pressure for 20 hours at from 180 to 185° C. and then for 22 hours at 205 to 215° C. A yellowish resinous product is obtained which is not soluble in water, scarcely soluble in hydrochloric acid but soluble in hot ethyl alcohol.

*Example 2*

400 parts of phenyl-$\beta$-aminopropionic acid are heated in a bath for 1½ hours under ordinary pressure at from 160 to 170° C., then for 21 hours under a pressure of 20 to 25 millimeters (mercury gauge) at 170 to 180° C., and finally for 23 hours under a pressure of 20 millimeters (mercury gauge) at 190 to 200° C. A yellow resinous product is obtained which is not soluble in hot alcohol, butanol and methyl acetate and compatible with acetyl cellulose. An addition of the product to acetyl cellulose improves the adhesive power of coatings obtainable therewith.

Similar products are obtained if 1000 parts of a 72 per cent aqueous acrylic acid solution are slowly allowed to flow to 930 parts of aniline while stirring and heating on the water-bath, heating being continued for 4 hours at about

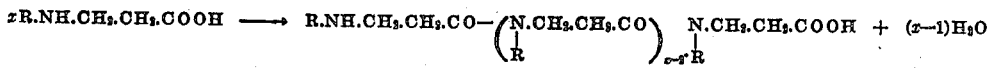

A preferable modification of carrying out the process consists in starting with unsaturated, preferably $\alpha$-$\beta$-unsaturated, monocarboxylic acids or their derivatives and primary monoarylamines.

100° C. while stirring in order to evaporate the water and the temperature then being raised as indicated in the first paragraph of this example. By varying the heating conditions, for example the duration of heating, the properties of the products, especially their solubility in organic solvents, may be influenced in a far-going degree.

From other aryl-β-amino carboxylic acids, such as mono-metatolyl-β-aminopropionic acid, α-naphthyl-β-aminopropionic or butyric acid and the like, similar products may be obtained in analogous manner. Instead of the free acids their esters, for example their methyl-, ethyl- or butylesters, or their amides may be employed.

What I claim is:

1. The process for producing high molecular compounds which comprises subjecting to a continued heat treatment a substance selected from the class consisting of acrylic acid and the amide forming derivatives thereof together with a primary monoarylamine at a temperature at which formation of long-chain polyamides takes place by interaction of a larger number of molecules of the amino carboxylic acid formed by adding the said amine on the double linkage of the acrylic acid.

2. High molecular polyamides derived from a substance selected from the class consisting of acids corresponding to the formula $$R_1.NH.CH_2.CH_2.CO_2H,$$

wherein $R_1$ represents an aryl radicle and the amide-forming derivatives of said acids by continued heat a treatment at a temperature at which formation of long-chain polyamides by interaction of a larger number of molecules of the said acids takes place.

HANNS UFER.